United States Patent [19]

Rejsa

[11] 4,128,074
[45] Dec. 5, 1978

[54] APPARATUS FOR COATING FOOD PRODUCTS

[75] Inventor: Jack J. Rejsa, Minneapolis, Minn.

[73] Assignee: The Pillsbury Company, Minneapolis, Minn.

[21] Appl. No.: 777,879

[22] Filed: Mar. 15, 1977

[51] Int. Cl.² .................. B05C 5/00; B05C 11/11
[52] U.S. Cl. ................................................ 118/24
[58] Field of Search .............. 118/24, 25, 612, 324; 222/238, 227; 426/302

[56] References Cited

U.S. PATENT DOCUMENTS

| 1,071,482 | 8/1913 | Umholtz | 222/238 |
| 3,905,326 | 9/1975 | Eisenberg | 118/24 |
| 3,908,584 | 9/1975 | Raque | 118/25 X |
| 4,032,049 | 6/1977 | Roberts | 222/238 |

*Primary Examiner*—John P. McIntosh
*Attorney, Agent, or Firm*—Michael D. Ellwein; Mart C. Matthews

[57] ABSTRACT

Chopped food such as ground beef or ground pork or sauce is cooked and maintained at an elevated temperature. An agitator is provided to stir up and dispense solid food pieces uniformly in the liquid phase. A pump connected to the agitator expells the uniform dispersion at a constant rate to a vibrating tray feeder. The feeder advances the food product as a fluid sheet which is allowed to fall from the edge of the feeder as a uniform continuously descending curtain onto the food base. Material that falls beyond the edges of the food base is recycled.

3 Claims, 3 Drawing Figures

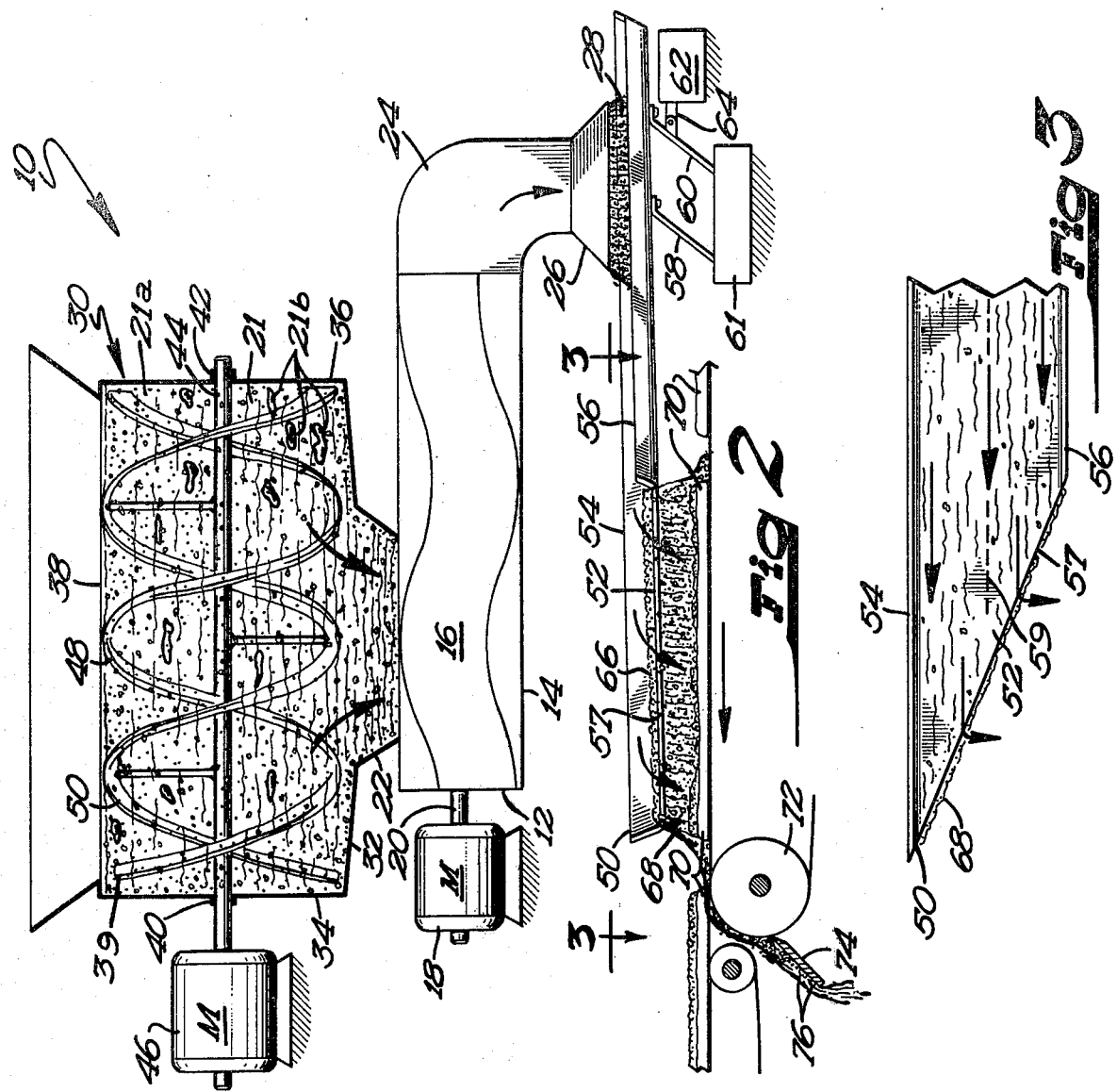

APPARATUS FOR COATING FOOD PRODUCTS

FIELD OF THE INVENTION

The invention relates to assembling composite food articles and is particularly useful in distributing meat or sauce onto a pizza crust.

THE PRIOR ART

Because the manual application of meat, meat sauces, savory sauces, etc. onto prepared pizza crust is slow, expensive and results in extreme weight variation of say 20% or more and introduces hygienic problems, attempts have been made to deposit the meat onto the pizza crusts mechanically. There are a number of problems in doing so. One is the difficulty in obtaining uniform distribution across the surface of the piece while at the same time maintaining the weight of the applied meat within the required limits. Moreover, if meat is pumped through a long, thin slit-like nozzle, clumps or chunks of meat will plug the nozzle at various points causing the meat to flow around the plugged areas which is, of course, undesirable because it breaks up the even flow. A pump can also introduce pulsations into the flow. This again will introduce variations into the uniform application and constant weight of the food applied to each crust.

In the developing of the present invention it was found that while heating chopped meat improves its fluidity allowing it to be pumped, the increased fluidity allows solids to settle out. Accordingly when hot chopped meat is fed to a pump, it was discovered that the pump tends to extract and pump the liquids first and pump the chopped meat solids only after a substantial portion of the liquid has been removed. This is unacceptable.

It was also discovered that chopped foods such as chopped meats exemplified by hamburger, loose pork sausage, etc. are difficult to apply in uniform quantities because of the unpredictable heterogenous nature of the product. Such foods consist primarily of three phases, fat, water and meat solids almost all of which is protein. This gives it a lumpy heterogenous character that may vary from a paste-like consistency to a lumpy mass with a substantial amount of water that has either separated or is in the process of separating from the meat solids. Both of these characteristics interfere with uniform application of the ground meat and the accurate application of a selected weight to a food base.

OBJECTS

The major objective of the invention is to provide an improved apparatus for assembling composite food products with the following characteristics and advantages: (a) the ability to distribute chopped food such as hamburger or loose sausage uniformly onto a food base and to maintain the applied weight in many cases within about ±5% of the selected target weight, (b) find a means for uniformly distributing chopped foods having more than one phase which interferes with its even distribution, (c) provision for converting the chopped food to a form in which it is capable of being distributed more evenly, (d) the elimination of slow, expensive hand application and a reduction in the opportunity for the food to be contaminated by pathogenic organisms, (e) provision for metering a heterogenous aqueous food dispersion to the point of application and provision for maintaining the food in a uniform condition when entering the metering means, (f) the provision of a relatively mechanically simple means for spreading an aqueous chopped meat dispersion uniformly across an area of ten inches or more in width, (g) provision for applying the meat to a food base such as a pizza crust uniformly across the surface of the pizza regardless of its size or shape, (h) provision for accurately controlling and varying the rate of application whereby the amount of chopped food applied can be increased or decreased in small increments as required to precisely regulate the amount applied within close tolerances.

THE FIGURES

FIG. 1 is a flow chart illustrating the steps performed in accordance with one preferred form of the invention.

FIG. 2 is a semi-diagramatic side elevational view, partly in section, of an apparatus embodying the invention, and FIG. 3 is a partial plan view taken on line 3—3 of FIG. 2.

In the accomplishment of the foregoing and related advantages and objectives, this invention then comprises the features hereinafter fully described and particularly pointed out in the claims, the following description setting forth in detail certain illustrative embodiments of the invention by way of example, these being indicative, however, of but a few of the various ways in which the principles of the invention may be employed.

SUMMARY OF THE INVENTION

One important aspect of the invention is the discovery that by converting the chopped food such as sauces, pizza topping, cooked meat, etc. to a fluid dispersion made up for example of meat solids or protein, fat and water and thereafter metering the fluid dispersion by pump means to a tray that will allow it to spread to layer form and then to the food base upon which it is to be applied that the meat can be applied much more uniformly and the rate of application can be controlled much more accurately than was heretofore possible.

Thus, hamburger and loose sausage is composed primarily of water, fat and a lesser amount of meat solids. Both hamburger and loose sausage have the consistency of a lumpy paste at room temperature. In accordance with the present invention, chopped meat or other chopped food is cooked and either heated or maintained at elevated temperature, preferably the latter, to maintain it as a fluid dispersion. While the temperature can be varied widely it should be at least above melting point of the fat present. In a typical application wherein chopped meat is applied to a pizza crust, it is preferred that the temperature be between about 120° and 160° F. and preferably within the narrower ranges of from about 130° to 155° F. at the time of application. After the fluid dispersion has been cooked and is at the proper temperature, it is agitated to distribute the chopped food solids uniformly therein and while in that condition is fed to a metering means or pump. The metering means advances the fluid dispersion at a controlled rate to a tray which allows it to spread to form a layer. The tray is preferably vibrated and thus can be thought of as a vibrating tray feeding means. The dispersion is then advanced by the tray feeder as a fluid layer and allowed to fall as a continuously descending curtain onto the food base, preferably so that portions of the curtain fall beyond the edges of the food base. That portion, if any, which falls beyond the edges of the food base is recycled.

The apparatus for carrying out the process comprises a pump or metering means, an agitator communicating with the inlet of the metering means for maintaining the dispersion in a uniform agitated condition as it is received by the metering means and a vibrating tray feeding means at the outlet of the pump to receive the material from the pump and transfer it to the food base. The vibrating tray feeding means preferably includes an outlet edge portion over which the chopped food falls as a continuously descending curtain onto the food product and in one preferred form of the invention, the edge extends at a diagonal to the direction of flow of material across the tray feeder so that the curtain is much wider than the width of the tray feeder itself.

DETAILED DESCRIPTION

Refer now to the figures, and particularly to FIGS. 2 and 3 which illustrate a preferred apparatus for carrying out the process in accordance with the invention.

As shown in FIG. 2, the apparatus indicated generally at 10 comprises a metering means or pump 12 composed of a cylindrical casing 14 and a screw-shaped rotor indicated generally at 16. The metering means is a positive displacement apparatus, and can, for example, comprise a pump manufactured by the Moyno Pump Division of Robbins and Myers, Inc. of Springfield, Ohio. Other pumps can, however, be used including gear pumps, lobe-type pumps, vane pumps, multiple piston pumps, etc. The only requirement of the pump is that it should be of the positive displacement type and flow pulsations, if present, should be relatively minor.

The rotor 16 of pump 12 is operated by a drive motor 18 connected to the rotor by shaft 20. The macerated, ground, chopped or otherwise subdivided food product for convenience all referred to generally herein as chopped food is fed to the pump through an inlet duct 22. During operation it passes through an outlet duct 24 which extends downwardly to an outlet nozzle 26 where the chopped food 28 falls onto a vibratory tray feeder to be described below.

The chopped food dispersion is preferably maintained at elevated temperature, i.e. above room temperature and in the case of chopped meat "elevated" means above the melting point of the fat contained therein. This is preferably between about 120° and 160° F. The best results have been achieved in the particular equipment used for preliminary work at temperatures between about 130° and 155° F. but these particular temperatures themselves are not considered utterly essential to the successful operation of the invention provided the chopped food is heated sufficiently to maintain it in the form of a fluid dispersion.

To maintain the dispersion uniform as it enters pump 12, it is supplied to the pump 12 from an agitator 30. The agitator 30 comprises a tank having a cylindrical wall 32. The tank is closed at the ends by vertical left and right end walls 34 and 36 and is open at the top 38. A removeable cover (not shown) is usually provided. An agitator 39 is journaled for rotation in bearings 40 and 42 and is provided with a horizontally extending rotateable agitator shaft 44 coupled to a drive motor 46. Rigidly affixed to shaft 44 as by means of spokes is a pair of ribbon-shaped helical flights 48 and 50 which keep the fluid dispersion 21 agitated continuously during operation so that the material passing through the inlet 22 of metering pump 12 has the uniform consistency.

As seen in FIG. 2 the dispersion 21 includes a liquid portion **21*a* in which are dispersed various sized solid pieces 21*b*. The liquid phase 221*a* is made up of both melted fat and water which of course themselves would tend to separate without the agitator 30**. The agitator can rotate relatively slowly, for example about 30 rpm.

Below nozzle 26 is a vibratory tray feeder 50 comprising a tray 52 having side walls 54 and 56. The tray 52 is supported upon one or more resilient elements such as inclined leaf springs 58 and 60 which are themselves rigidly connected at their lower ends to a fixed supporting base 61. The tray 50 and the springs 58 and 60 are connected to a vibrator 62 by link 64 which functions to vibrate tray 50 from left to right in FIG. 2. The tray has an outlet edge portion 57 over which the fluid dispersion 66 falls to provide a continuously descending curtain 68 that extends across and is wide enough to cover the widest dimension of the food base being covered. For example, if the food base is a circular pizza crust 70 10 inches in diameter the curtain must be at least 10 inches wide. The curtain falls onto the crust 70 and also onto the surface of an underlying endless conveyor 72 beyond the edges of the crust 70. This excess material is removed from conveyor 72 by a scraper or doctor blade 74 having an edge pressed against the conveyor 72. The excess material is recycled to the supply tank 30.

As shown in FIG. 3, the edge 57 extends at a diagonal or oblique angle with respect to the axis 59 of the tray feeder 50, thus the falling curtain 68 is much wider than the cross sectional width of the tray feeder 50. In this way a relatively narrow tray can be used to cover a much wider food base.

It will thus be seen that the cooked meat is maintained in a fluid condition by holding it at an elevated temperature at least high enough to melt the fat therein. As a result it can then be accurately metered by a pump 12. Thus, the success of the invention is due in large part to converting the meat to a fluid form and metering it as a fluid with metering pump 12. Thus, the pump 12 is able to meter the chopped food at the desired rate thereby allowing accurate control of the amount or weight applied to each pizza crust 70 while the vibratory tray feeder functions primarily to advance the dispersion from the pump and to spread it out over a wider area. To a lesser extent it helps to even out any flow variations that might be present.

Another important advantage of the invention is that it allows foods to be applied uniformly and in a controlled amount without manual handling which is slow and expensive as well as subjecting the food to contamination by pathogenic organisms. In addition, since all water and fat is utilized it keep these liquids together with flavors and spices therein from being lost prior to application. In addition, the tray feeder spreads out the dispersion over a very wide area but will not become plugged as it would a slit-type nozzle. Thus the vibrating tray functions effectively to spread the heterogenous lumpy dispersion over a wide area and the invention in many cases maintains the weight of applied material within ± 5% of the target weight.

EXAMPLE 1

Hamburger is applied to 10" cooked pizza crusts prepared for commercial retail sales by cooking the hamburger until done and maintaining it at 130° F. in hopper 30. The agitator is turned at 30 rpm. Pump 12 is operated so that 3000 pounds per hour is pumped through outlet duct 24 onto a tray feeder 50 vibrating at 3600 vibrations per minute. The falling curtain 68 is 12" wide and excess material 76 is recycled to hopper 30.

EXAMPLE 2

Operation is carried out as in Example 1 except that the chopped meat dispersion is maintained at 155° F.

EXAMPLE 3

Operation is conducted as in Example 2 except that instead of using hamburger, loose pork sausage is used, having a fat content of 38%.

EXAMPLE 4

Cooked hamburger containing all the natural solids and liquids is placed in a hopper, heated to 140° F. and stirred manually to maintain the aqueous dispersion uniform i.e. to prevent settling of solids and the separation of fat. From this hopper the dispersion passes through a duct to the inlet of a vane-type positive displacement metering pump which pumps the dispersion to a vibrating tray feeder having a tray inclined downwardly at an angle of about 8° to the horizontal proceeding from the inlet end at one end toward the outlet at the other end. The tray is vibrated at 3000 vibrations per minute. The meat is allowed to fall onto a pizza crust and excess material deposited beyond the edges of the crust is recycled to the hopper.

EXAMPLE 5

A pizza sauce having a tomato sauce base and including chopped onions and chopped green pepper but no meat is placed in a hopper and agitated continuously at elevated temperature of 120° F. From the hopper the aqueous dispersion passes to the inlet of a positive displacement metering pump which transfers the dispersion at a controlled rate to a vibratory tray feeder vibrating it 4000 vibrations per minute. From the outlet edge of the vibratory tray feeder the aqueous dispersion falls as a continuously descending curtain onto a succession of pizza crusts traveling horizontally through the curtain. Excess material falling beyond the edges of the crusts is recycled to the hopper.

What is claimed is:

1. An apparatus for assembling composite food products by depositing a fluid food product dispersion comprising, macerated, ground, chopped, or an otherwise subdivided food product onto food bases, said apparatus comprising:
    (a) a tank means for storing a supply of said dispersion, said tank including side and end walls;
    (b) a metering means communicating with the bottom of the tank for withdrawing and expelling said dispersion from the tank at a controlled rate;
    (c) a nozzle connected to the outlet of the metering means for dispensing said dispersion in a downward direction;
    (d) a vibrating tray feeder means generally horizontally disposed above a food base and below said nozzle, said feeder means having an outlet edge over which said dispersion is allowed to fall as a uniform continuously descending curtain after passing across the surface thereof; said outlet edge being positioned above the food bases traveling beneath said feeder means and being of sufficient width to distribute said dispersion onto the upper surface of the food bases, vibratory support means for said feeder means, motor means for imparting vibratory motion thereto; and
    (e) a conveyor beneath said feeder means for conveying the food bases.

2. The apparatus of claim 1 wherein the metering means includes a rotor mounted for rotation within a cylindrical casing at the bottom of the tank means.

3. The apparatus of claim 1 wherein said dispersion is pizza topping and the food base is a pizza shell.

* * * * *